(12) United States Patent
Klein

(10) Patent No.: US 6,701,346 B1
(45) Date of Patent: *Mar. 2, 2004

(54) MANAGING REDUNDANT ELECTRONIC MESSAGES

(75) Inventor: Dean A. Klein, City of Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/351,928

(22) Filed: Jul. 12, 1999

(51) Int. Cl.⁷ .................................................. G06F 15/16
(52) U.S. Cl. ....................................... 709/206; 709/207
(58) Field of Search ............................... 709/206, 207, 709/232, 223, 224, 255

(56) References Cited

U.S. PATENT DOCUMENTS

| | | | |
|---|---|---|---|
| 5,363,090 A | | 11/1994 | Cannon et al. ........ 340/825.44 |
| 5,647,002 A | | 7/1997 | Brunson ...................... 380/49 |
| 5,754,778 A | | 5/1998 | Shoujima ............... 395/200.36 |
| 5,826,022 A | * | 10/1998 | Nielsen ....................... 395/200 |
| 5,905,863 A | * | 5/1999 | Knowles et al. ............ 709/206 |
| 5,923,848 A | * | 7/1999 | Goodhand et al. ......... 709/206 |
| 5,948,058 A | | 9/1999 | Kudoh et al. ............... 709/206 |
| 5,999,932 A | * | 12/1999 | Paul ............................. 707/10 |
| 6,044,395 A | | 3/2000 | Costales et al. ............ 709/206 |
| 6,076,101 A | * | 6/2000 | Kamakura et al. ......... 709/206 |
| 6,092,101 A | * | 7/2000 | Birrell et al. ............... 709/206 |
| 6,092,103 A | | 7/2000 | Pritsch ....................... 709/206 |
| 6,128,101 A | | 10/2000 | Saito .......................... 358/402 |
| 6,167,434 A | * | 12/2000 | Pang .......................... 709/206 |
| 6,266,692 B1 | | 7/2001 | Greenstein ................. 709/206 |
| 6,289,372 B1 | * | 9/2001 | Vyaznikov .................. 709/206 |

FOREIGN PATENT DOCUMENTS

| | | |
|---|---|---|
| JP | 10-041974 | 2/1998 |
| JP | 10-222438 * | 8/1998 |

OTHER PUBLICATIONS

U.S. application No. 09/351,934 (current status is "notice of allowance mailed and received in office of publications").*

* cited by examiner

*Primary Examiner*—Dung C. Dinh
*Assistant Examiner*—Isaac Woo
(74) *Attorney, Agent, or Firm*—Dorsey & Whitney LLP

(57) ABSTRACT

A system for managing messages so that redundant messages need not be reviewed by a user. The system monitors electronic messages received by a user, and determines whether the received electronic messages are related to pending electronic messages for the user, such as by being a part of the same message thread. Redundant messages among the related messages are then identified, and are indicated in one or more ways such as by deleting the redundant messages or by altering the visual indicators of the messages presented to the user.

20 Claims, 9 Drawing Sheets

Fig. 2C

| User 1 | User 2 | User 3 | User 4 |
|---|---|---|---|
| m1 | m1 | m1 | m1 |
| m2(m1) | m3(m1) | m3(m1) | m3(m1) |
| m3(m1) | | m5(m3:m1) | m4(m1) |
| | | m6(m3:m1) | m5(m3:m1) |
| | | | m7(m5:m3:m1 & m6:m3:m1) |

Fig. 2D

| User 1 | User 2 | User 3 | User 4 |
|---|---|---|---|
| m2(m1) | m3(m1) | m5(m3:m1) | m4(m1) |
| m3(m1) | | m6(m3:m1) | m7(m5:m3:m1 & m6:m3:m1) |

MANAGING REDUNDANT ELECTRONIC MESSAGES

TECHNICAL FIELD

The present invention relates generally to communicating via electronic messages, and more particularly to identifying and managing redundant electronic messages.

BACKGROUND OF THE INVENTION

Electronically-communicated messages ("electronic messages" or "electronic communications") such as email, voicemail, paging messages, and transmitted documents have become increasingly popular and pervasive in recent years. The ability to send an electronic message to multiple recipients provides for quick and efficient communication, and the use of electronic messages has become common in business settings.

While electronic messages can be specified in a variety of formats, a typical electronic message will include substantive contents to be conveyed (e.g., text and/or images) as well as a preceding header with various identifying information about the message. For example, a header of an electronic email message might include an identification of the sender and of the recipients, as well as a subject for the message. Headers can also include information such as the size of the message, a specification of the encoding used for the message (e.g., a particular compression algorithm), a specification of the transmission protocol for which the message was created (e.g., TCP/IP), or a unique identifier for the message.

While a user can create and send a message independent of any other messages, messages are often part of a message thread. A message thread is a group of messages that are related to each other, such as when one message is a response to (e.g., a reply to or a forwarding of) another message. Messages in the same message thread will typically share various common message information, such as related subjects or common message content. For example, a reply email or voicemail will often include the contents of the original message as well as additional contents specific to the reply, and the subject line of a reply or forwarded email will often include the original subject line along with a relation indicator such as "RE:" or "FW:" respectively.

Consider, for example, the following situation in which co-workers send a series of emails that are part of a single message thread back and forth to each other, and each response message contains the contents of the message being responded to as well as additional unique content. Worker A first sends message 1 to worker B and to supervisor D. Worker B then sends response message 2 to A and D, and worker A responds to message 2 with message 3 to B and D. Thus, supervisor D has received message 1, message 2 which includes the contents of message 1, and message 3 which includes the contents of message 2.

While message threads can provide various benefits, a message thread message can become redundant when the contents of the message is included in the contents of other later message thread messages. In the example above, messages 1 and 2 are redundant in light of message 3 for supervisor D, and the supervisor could thus receive all of the contents that are present in messages 1 and 2 by reviewing only message 3.

Current mechanisms for managing pending messages for a user create problems with respect to redundant message thread messages. Pending messages for a user include those messages which have been received but not yet reviewed, as well as those messages which have been reviewed and retained. When a user has received multiple messages that are part of a common message thread, current message management mechanisms store and present each such message to the user. However, when the pending messages for a user include messages that are redundant in light of other pending messages, various inefficiencies result. For example, extra computer resources are needed for the storage and presentation of the redundant messages, and extra time is needed by the user to review each message and to determine what contents are new and what contents are redundant.

SUMMARY OF THE INVENTION

The present invention provides a system for managing messages so that redundant messages need not be reviewed by a user. Techniques of the invention monitor electronic messages received by a user and determine whether the received electronic messages are related to pending electronic messages for the user, such as by being part of the same message thread. Redundant messages among the related messages are then identified, and the redundant messages are indicated in one or more ways such as by deleting the redundant messages or by altering the visual indicators of the redundant messages presented to the user.

In one aspect of the invention, multiple electronic messages sent to the user are identified, at least one of the electronic messages is determined to have contents included in the contents of another of the electronic messages, and those electronic messages determined to have contents included in the contents of another of the electronic messages are indicated to the user.

BRIEF DESCRIPTION OF THE DRAWINGS

FIGS. 2A–2C illustrate examples of messages sent as part of a message thread, and FIG. 2D illustrates an example of the sent messages after they are managed by an embodiment of the system of the present invention.

DETAILED DESCRIPTION OF THE INVENTION

The present invention provides a system for identifying and managing redundant electronic messages received by a user. In particular, a Message Manager system monitors electronic messages received by a user, determines whether the received electronic messages are related to pending electronic messages for the user, identifies redundant messages among the related messages, and indicates the redundant messages in one or more ways.

Figure 1:
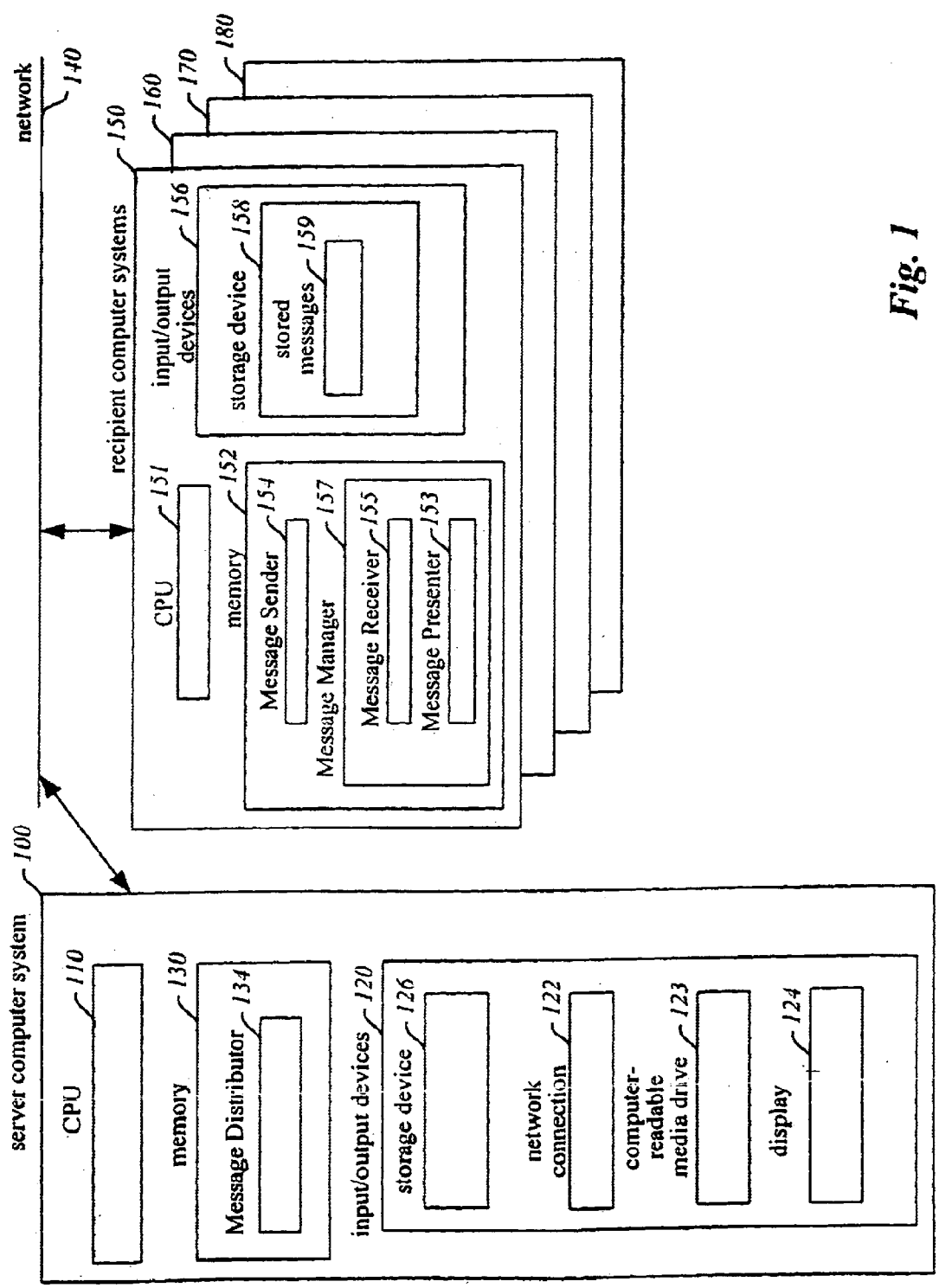
FIG. 1 is a block diagram illustrating an embodiment of the Message Manager system of the present invention.

FIG. 1 illustrates message recipient computer systems 150, 160, 170, and 180 each suitable for executing a Message Manager system 157 on behalf of the users (not shown) of those computer systems. For the sake of brevity, only computer system 150 is shown in detail. The computer system 150 includes a CPU 151, input/output devices 156, and a memory 152. The input/output devices 156 include a storage device 158 on which is stored messages 159 that have been received by the user of computer system 150 and that are still pending. The input/output devices 156 may also include a variety of other devices (not shown). The memory 152 stores an executing copy of the Message Manager system 157, as well as an executing copy of a Message Sender component 154 that enables the user to send messages to other users. Those skilled in the art will appreciate that an executing copy of a component or system may only be partially stored in the memory 152, such as when the executable code for the component or system is stored on the storage device 158 and the operating system loads only a portion of the cod into the memory at a single time (e.g., with a memory paging system).

The Message tanager system 157 includes a Message Receiver component 155 and a Message Presenter component 153. The Message Receiver component 155 monitors messages received by the user of computer system 150, compares received messages to other pending messages 159 to identify redundant messages, and indicates the redundant messages in one of a variety of ways. The Message Presenter component 153 presents the currently pending messages to the user, and can visually identify pending redundant messages (e.g., by dimming the indicator for such messages when a list of all pending messages is shown). The activities of the Message Receiver component 155 in managing redundant messages are illustrated in greater detail below with respect to FIGS. 2A–2D.

In some embodiments, each recipient computer system sends messages directly to other recipient computer systems and similarly receives messages directly from other recipient computer systems. In alternate embodiments, one or more server computer systems can manage the distribution of electronic messages, such as by receiving a copy of a message to be distributed and by forwarding copies of the message to the various recipients of the message. Server computer system 100 illustrated in FIG. 1 is suitable for performing such a distribution role, and includes a CPU 110, a memory 130, and input/output devices 120. The memory 130 stores an executing copy of the Message Distributor component 134, which receives messages from recipient computer systems that are sending messages and which distributes copies of the messages to the appropriate recipients. The input/output devices 120 of the server computer system 100 can include a storage device 126, a network connection 122, a computer-readable media drive 123, and a display 124, as well as other devices not shown.

In embodiments in which the Message Distributor component 134 distributes messages, each recipient computer system can have an individual Message Manager system 157 as described above, or the server computer system could instead have one or more executing Message Manager systems 157 (not shown). In embodiments in which the one or more Message Manager systems 157 are executing at the server computer system 100, the Message Manager systems 157 could process the messages to be sent to each user before the messages are actually distributed. In this manner, the recipient computer systems could avoid receiving redundant messages. In addition, if the Message Distributor component 134 distributes the messages, the server computer system 100 could store the pending stored messages 159 for each user (not shown) until the Message Presenter component 153 for that user requested the currently pending messages.

Those skilled in the art will appreciate that computer systems 100 and 150 are merely illustrative and are not intended to limit the scope of the present invention. The computer systems may contain additional components or may lack some illustrated components, and computer system 150 may send messages to or receive messages from any accessible device, including through a wireless network or wired network such as the Internet. For example, the functions performed by the Message Receiver component may be separated among multiple components such as a Message Comparer component that compares received messages to other pending messages to identify redundant messages and a Message Indicator component that indicates the redundant messages in one of a variety of ways. Alternately, the message indicating functions could be performed by the Message Presenter component. Accordingly, the present invention may be practiced with other computer system configurations.

Figure 2B:
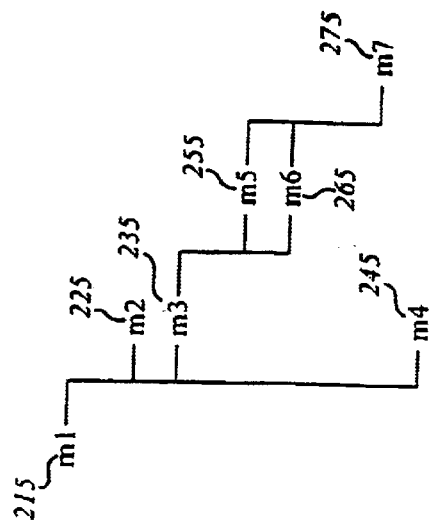
Figure 2A:
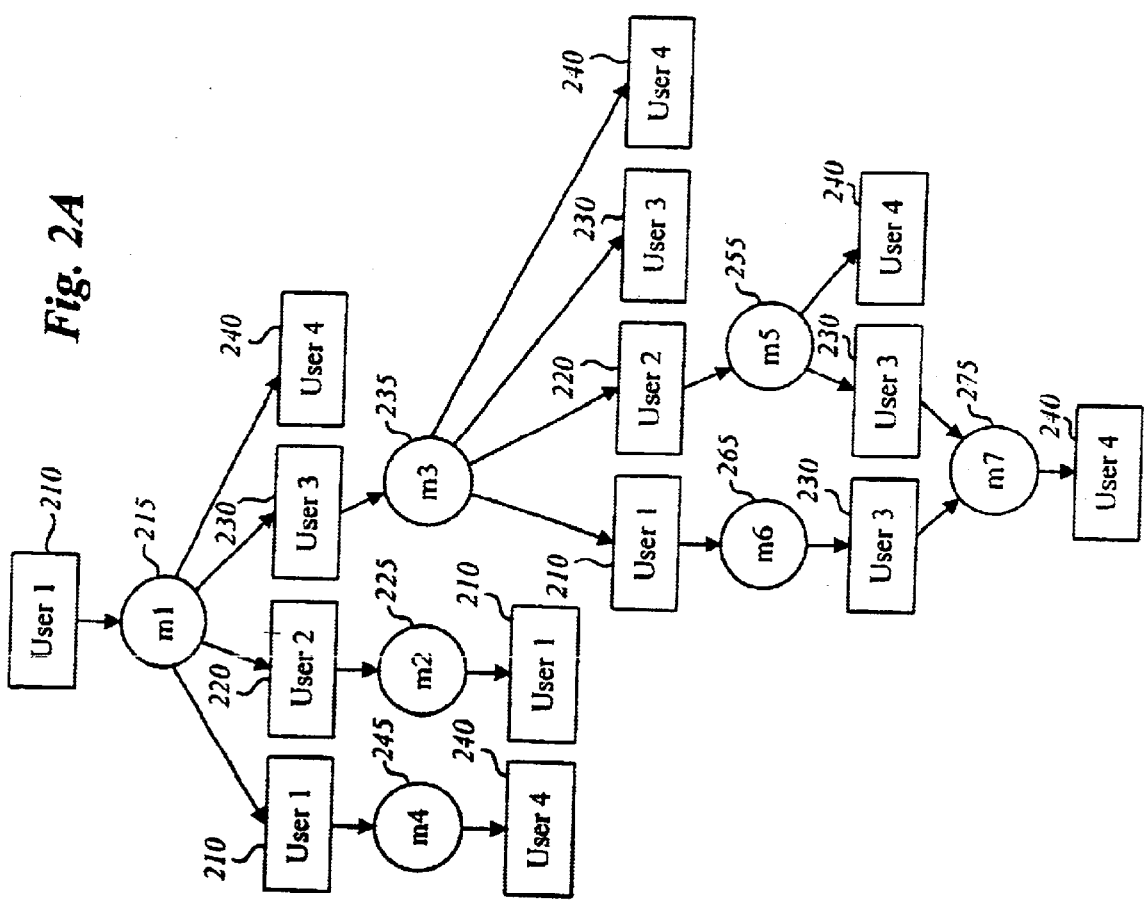

The activities of the Message Receiver component 155 in managing redundant messages can be illustrated by way of example with respect to FIGS. 2A–2D. FIGS. 2A–2C illustrate various representations of a message thread consisting of several messages sent between four users. FIG. 2A illustrates the series of actions involved in creating the message thread, FIG. 2B illustrates the messages in a hierarchical fashion to show how the messages are related to each other, and FIG. 2C illustrates the messages received by each user. FIG. 2D illustrates the same messages as shown in FIG. 2C after the Message Manager system 157 of the present invention has identified redundant messages and removed them from being pending messages.

As shown in FIG. 2A, the message thread begins when User 1 210 creates message M1 215 and sends copies to User 2 220, User 3 230, and User 4 240. User 1 also keeps a copy of message M1, either by explicitly identifying User 1 as a recipient or through an automated feature of the message sending program. At some point after receiving message M1, User 2 creates a reply message M2 225 which User 2 sends to User 1. In the illustrated embodiment, the contents of response messages include all the contents of the messages to which they are responding, and may also include message header information (e.g., the sender, recipients, message send time, and message subject) from the messages to which they are responding. Thus, message M2 includes the contents of message M1. While response message can include only the contents of the message to which they are responding without adding any additional contents, the response messages in this illustrated embodiment do include additional content information unique to the response message.

Similarly to User 2, User 3 creates message M3 235 in response to message M1, and sends message M3 to Users 1, 2, 3, and 4. At some point after sending message M1, User 1 realizes that User 4 should receive additional information related to message M1. Thus, User 1 creates a new message M4 245 by forwarding a copy of message M1 to User 4 along with additional new information. At some point after receiving message M3, User 1 responds by creating response message M6 265 and sending the message to User 3. Similarly, at some point after receiving message M3, User 2 creates response message M5 255 and sends the message to Users 3 and 4. Finally, after receiving both messages M6 and M5, User 3 creates message M7 275 as a response to both messages, and sends the message to User 4. Thus, messages M1–M7 are all part of the same message thread.

FIG. 2B illustrates the messages in the message thread in a hierarchical fashion to show how the messages are related to each other. Thus, FIG. 2B illustrates that message M1 is the head (or "root") of the message thread, and that messages M2, M3, and M4 are responses to (or "children" of) message M1. Messages M2, M3, and M4 are referred to as sibling messages because they are children of the same message, and message M1 is referred to as a parent of the messages. As is further illustrated by the message hierarchy, messages M5 and M6 is are responses to message M3, and message M7 is a response to both messages M5 and M6. Message M7 can also be described as a "descendant" of each of the messages M5, M6, M3, and M1, and each of the messages M5, M6, M3, and M1 can similarly be described as "ancestors" of message M7.

FIG. 2C illustrates the messages in the message thread by showing the messages received by each user. If the users have not received any other messages and have not deleted any of these messages that they received, then these messages will reflect their currently pending messages. Thus, User 1 first received message M1 followed by messages M2 and M3. In FIGS. 2C and 2D, relationships between messages are shown by information in parentheses following the message. Thus, since message M1 was not a response to any other message, no information is shown in parentheses following that message. Conversely, since messages M2 and M3 were each responses to message M1, message M1 is shown in parentheses following each of those messages. As a reminder, in the illustrated embodiment each response message will include in its contents the contents of the messages to which it is responding. Thus, the contents of a message will include the contents of the related messages shown in parentheses following the message.

In a similar manner to that shown for User 1, User 2 first received message M1 and then received message M3. User 3 also received message M1, followed by messages M3, M5, and M6. As is shown by the information in the parentheses following messages M5 and M6, both messages are responses to message M3 and thus include the contents of message M3. While neither message M5 or M6 are direct responses to message M1, the contents of message M1 are included in both messages indirectly since message M1 is an ancestor and the M1 contents are present in the contents of message M3. This is illustrated graphically by showing message M1 separated from message M3 by a colon in the parentheses. User 4 similarly received messages M1, M3, M4, M5, and M7.

FIG. 2D illustrates the same messages as shown in FIG. 2C after the Message Manager system 157 of the present invention has identified redundant messages and deleted them. Those skilled in the art will appreciate that a variety of actions can be taken for redundant messages other than deleting them. For example, if the pending messages are stored in a default message folder (e.g., the Inbox folder), the redundant messages can be moved to a different folder. Alternately, the redundant messages could be left in the Inbox folder but could be differentiated from the other pending messages, such as by displaying the redundant messages in a distinct manner (e.g., dimmed) or by changing the urgency or priority of the redundant messages. In yet another embodiment, the Message Manager system 157 could recommend one or more actions be taken with redundant messages, but could solicit user input as confirmation of the action before it is performed or to reverse a default action that was already performed.

In order to delete or otherwise indicate the redundant messages, the Message Manager system 157 first identifies for each user the pending messages that are redundant for that user. In the illustrated embodiment, a pending message for a user is determined to be redundant if its contents are completely included in the contents of another pending message for the user. Those skilled in the art will appreciate that messages can be determined to be redundant in other situations, such as if only a portion of the contents of the message are present in another message (e.g., if only the additional unique comments for a response message are present).

Thus, as shown in FIG. 2D, message M1 has been deleted for User 1 because the contents of message M1 are present in both pending messages M2 and M3. Since messages M2 and M3 both have unique contents that are not present in the other message, however, neither of those messages is redundant in light of the other message. Thus, neither message M2 nor M3 is deleted for User 1. Similarly to User 1, message M1 has also been deleted for User 2 because message M1 is redundant in light of the pending message M3. Both messages M1 and M3 have been deleted for User 3 because both messages are redundant in light of either message M5 or M6. Since both message M5 and M6 have unique contents not present in any other pending message for User 3, neither message is deleted. Finally, messages M1, M3, and M5 have been deleted for User 4 as being redundant in light of either message M4 or M7. In particular, message M1 is redundant in light of both message M4 and message M7, while messages M3 and M5 are redundant in light of message M7. Thus, after the Message Manager system 157 has identified and deleted the redundant messages, less storage space is required to store the messages and less user time is needed to review the messages.

Figure 3:
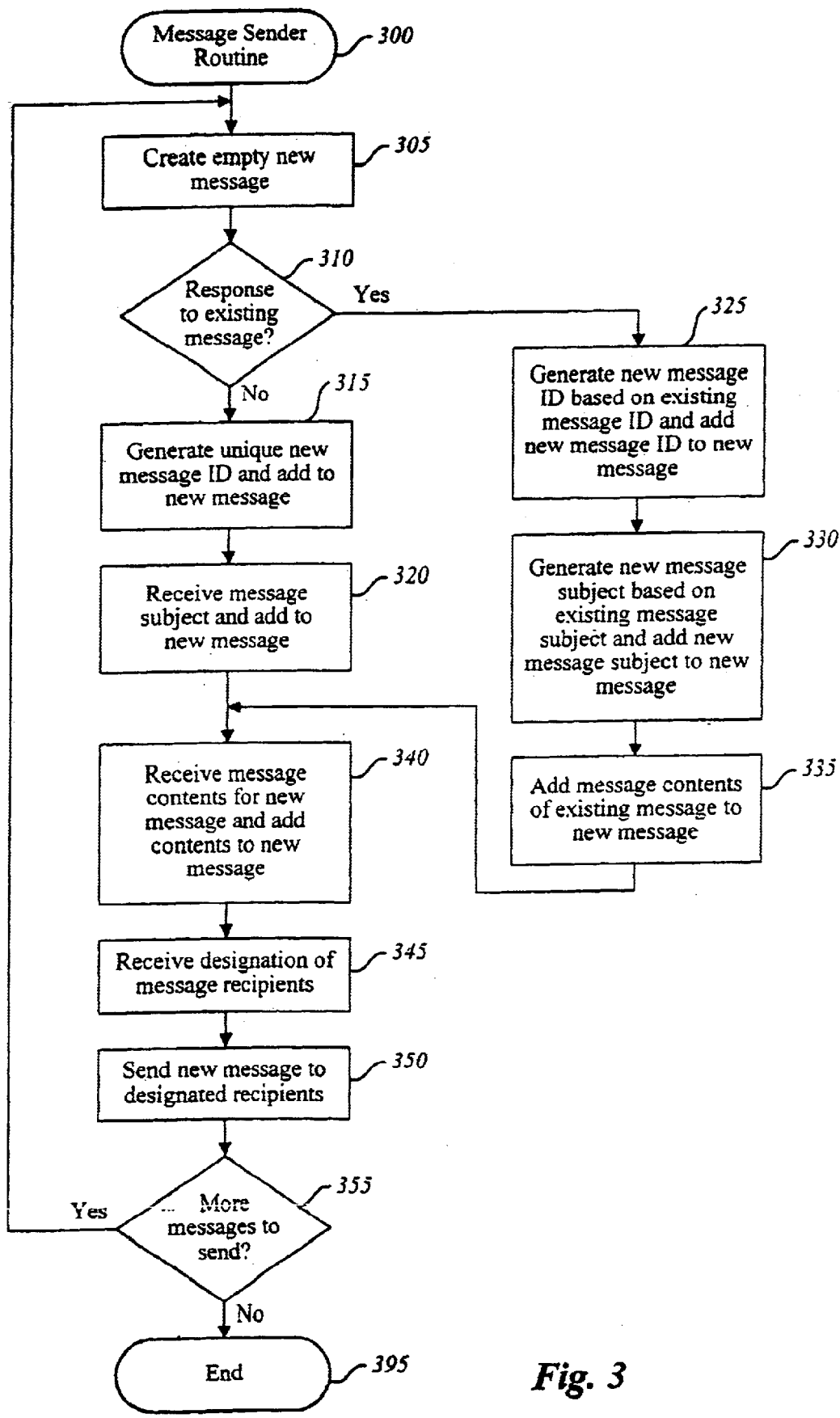
FIG. 3 is an exemplary flow diagram of an embodiment of the Message Sender routine.

FIG. 3 is an exemplary flow diagram of an embodiment of the Message Sender 154 routine 300. The routine allows a user to create a new message and to send the message to one or more recipients. If the new message to be sent is not part of an existing message thread (i.e., is not a response to an existing message), the user specifies a message subject and the message contents for the message. In addition, a unique message ID is assigned to the message before it is sent. If the new message to be sent is instead a response to an existing message, the contents of the existing message are included in the new message, the subject for the new message is generated based on the subject of the existing message, and a unique message ID for the new message is generated based on the message ID for the existing message.

The Message Sender routine begins at step 305 where a new empty message is created. The routine continues to step 310 to determine if the new message will be a response to an existing message. If not, the routine continues to step 315 to generate a unique message ID, and assigns the new message ID to the new message. The routine then continues to step 320 to receive the message subject from the user, and to add the message subject to the message.

If it was instead determined in step 310 that the new message is to be a response to an existing message, the routine instead continues to step 325 to generate a unique message ID based on the message ID for the existing message being responded to. The generated message ID is then added to the new message. Those skilled in the art will appreciate that a wide variety of relationships between IDs can be used to indicate response relationships. For example, referring to the messages shown in FIG. 2B, message M1 may have received the unique ID 1234. When messages M2, M3, and M4 are created in response to message M1, the unique IDs assigned to each of the response messages can show that relationship to message M1 (e.g., with the IDs 1234-01, 1234-02, and 1234-03 respectively). Similarly, the IDs for messages M5 and M6 can show their relationship to messages M3 and M1 (e.g., with the IDs 1234-02-01 and 1234-02-02 respectively). A related ID can be generated based on an existing ID in any manner that is later discernible.

After step 325, the routine continues to step 330 to generate a new message subject based on the message subject for the existing message, and adds the new message subject to the new message. Those skilled in the art will appreciate that a wide variety of relationships between message subjects can be used to indicate response relationships. For example, referring to the messages shown in FIG. 2B, message M1 may have the subject "XYZ project." When messages M2, M3, and M4 are created in response to message M1, the subjects assigned to each of the response messages may show that relationship to message M1 (e.g., with message subjects "RE: XYZ project-01," "RE: XYZ project-02" and "RE: XYZ project 03" respectively, or with message subject "RE: XYZ project" for each message). Similarly, the subject for message M5 can show its relationship to messages M3 and M1 (e.g., with message subject "RE: RE: XYZ project-02-01"). A related message subject can be generated based on an existing message subject in any manner that is later discernible.

After step 330, the routine then continues to step 335 to add the message contents of the existing message to the new message. In the illustrated embodiment, the message contents of the message being responded to are automatically added to the contents of the response message. In alternate embodiments, the user may indicate whether to add the message contents of the message being responded to, or the new message may merely contain a link or a pointer to the message being responded to.

After steps 335 or 320, the routine continues to step 340 to receive from the user the message contents for the new message, and adds the new contents to the new message. Those skilled in the art will appreciate that the message contents can include a wide variety of information types such as text, graphics, audio or video clips, attached documents, etc. Alternately, no new message contents may be added to a new message. The routine next continues to step 345 to receive from the user a designation of the message recipients. The routine then continues to step 350 and sends the new message to the designated recipients. In step 355, the routine determines if there are more messages to send. If so, the routine returns to step 305, and if not the routine ends at step 395.

Those skilled in the art will appreciate that new messages can be created in a variety of ways. For example, new messages may not be each assigned a unique ID. Alternately, a response message may have an ID or subject that is independent of the ID and subject of the message being responded to, and response message may include only some or none of the contents of the message being responded to. In addition, the contents and recipients of the new message can be generated automatically rather than being received from the user. For example, a reply message may automatically select the sender of the message being responded to as the recipient of the new message.

Figure 4:
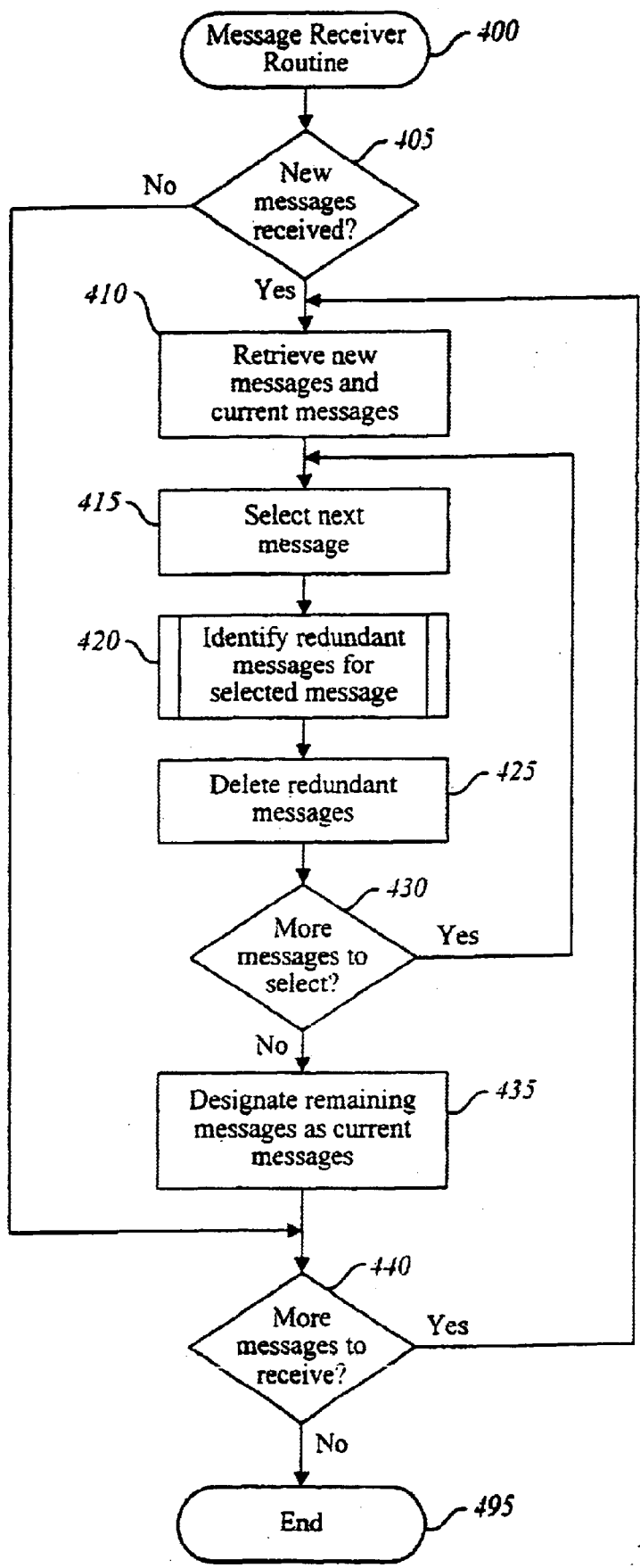
FIG. 4 is an exemplary flow diagram of an embodiment of the Message Receiver routine.

FIG. 4 is an exemplary flow diagram of an embodiment of the Message Receiver 155 routine 400. The routine receives messages sent to a user, and before the messages are made available to the user the routine determines if any of the pending or new messages are redundant in light of other pending or new messages. If any of the pending or new messages are redundant, the routine deletes the redundant messages.

The routine begins at step 405 where it checks if any new messages have been received. If so, the routine continues to step 410 to retrieve the new messages as well as any currently pending messages. The routine then continues to step 415 to select the next retrieved message, beginning with the first message. In step 420, the routine identifies messages among the retrieved messages that are redundant in light of the selected message by executing subroutine 420. After identifying the redundant messages, the routine continues to step 425 to delete the redundant messages.

At step 430, the routine then determines if there are more retrieved messages to select. If so, the routine returns to step 415, and if not the routine continues to step 435. In step 435, the routine designates the remaining retrieved messages as the currently pending messages. This can be done in a variety of ways, such as by storing the remaining messages locally or by notifying another component to stores only the new group of pending messages. Alternately, if the pending messages are stored or presented in a default location (e.g., the Inbox Folder), the non-pending messages could be removed from this default location. After step 435, or if it was instead determined in step 405 that there were no new messages received, the routine continues to step 440 to determine if there are more new messages to receive. If so the routine returns to step 410, and if not the routine ends at step 495.

Those skilled in the art will appreciate that redundant messages can be managed in a variety of ways. For example, redundant messages could be indicated as being redundant in ways other than being deleted. In addition, messages could be presented to the user when first received, and only processed for redundant messages on a periodic basis or when directed by the user. Moreover, user confirmation could be required before deleting any message identified as being redundant, or before deleting a currently pending message that the user may have already reviewed.

Figure 5:
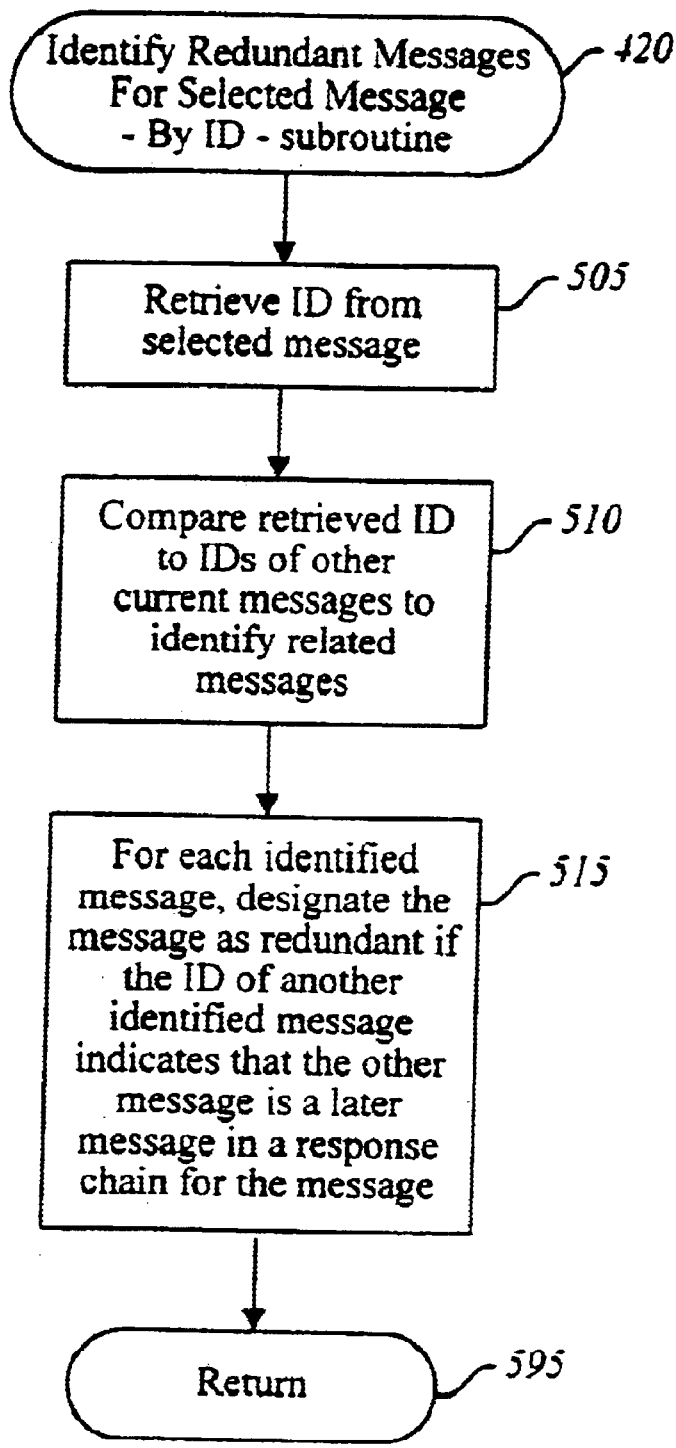
FIG. 5 is an exemplary flow diagram of an embodiment of the Identify Redundant Messages For Selected Message—By ID subroutine.
Figure 6:
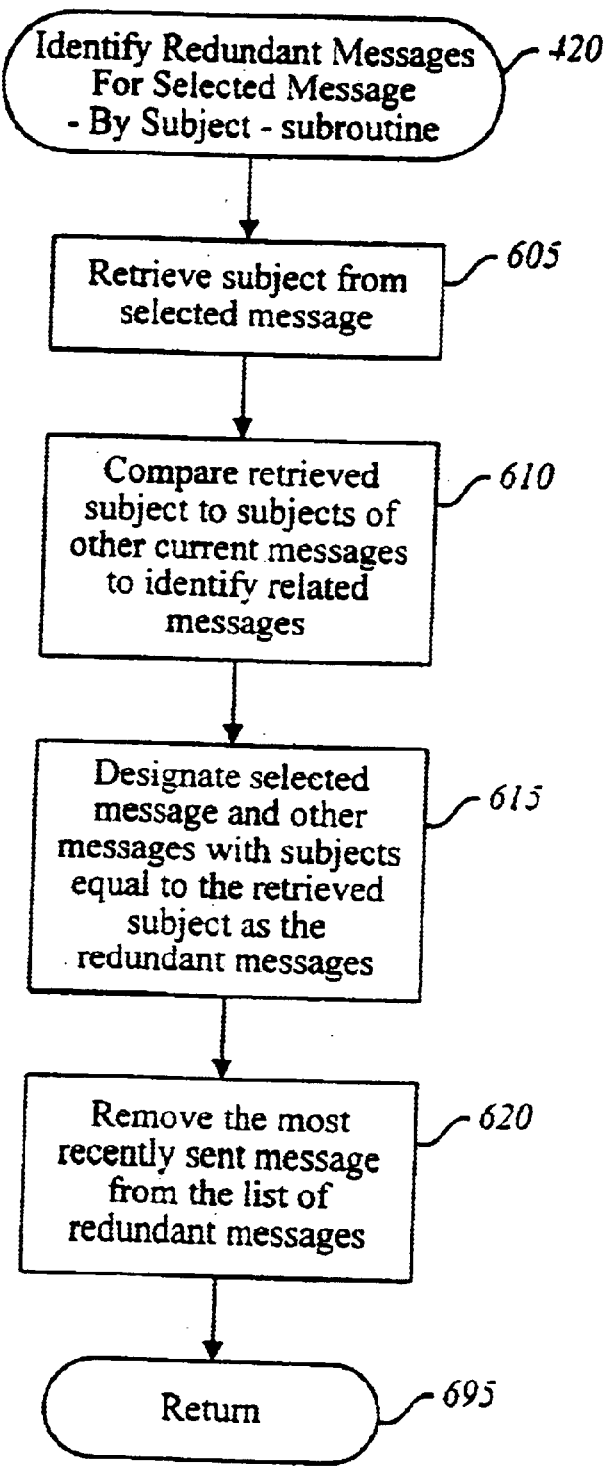
FIG. 6 is an exemplary flow diagram of an embodiment of the Identify Redundant Messages For Selected Message—By Subject subroutine.
Figure 7:
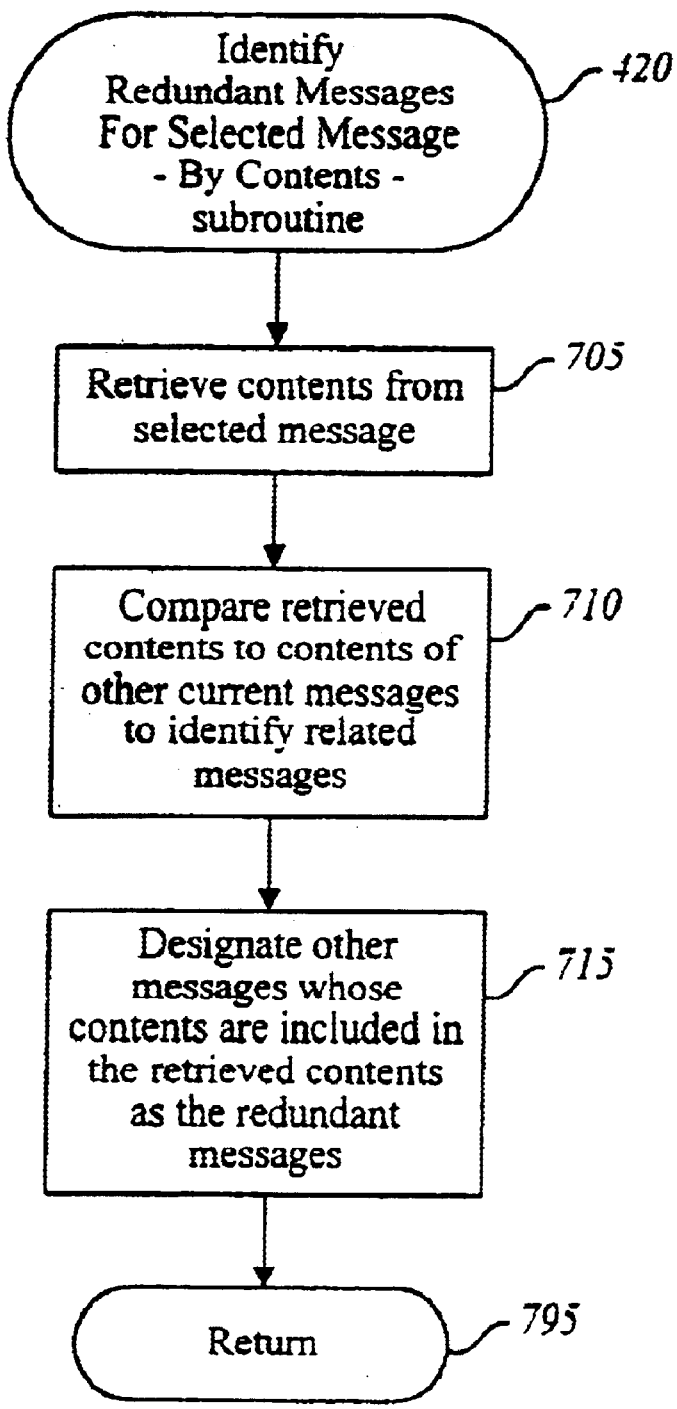
FIG. 7 is an exemplary flow diagram of an embodiment of the Identify Redundant Messages For Selected Message—By Contents subroutine.

FIGS. 5, 6, and 7 illustrate three alternate embodiments of the Identify Redundant Messages For Selected Message subroutine 420. FIG. 5 describes an embodiment of subroutine 420 in which message IDs are used to identify redundant messages. FIG. 6 describes an embodiment of subroutine 420 in which message subjects and message send times are used to identify redundant messages. FIG. 7 describes an embodiment of subroutine 420 in which message contents are used to identify redundant messages. Those skilled in the art will appreciate that other methods can also be used to identify redundant messages.

FIG. 5 is an exemplary flow diagram of an alternate embodiment of subroutine 420 in which message IDs are used to identify redundant messages. In this embodiment, all of the messages in a message thread have related IDs, and the relationships among IDs indicate which messages are responses to which other messages. Exemplary related message IDs for the messages shown in FIG. 2B are discussed above with respect to FIG. 3. Those skilled in the art will appreciate that a wide variety of relationships between IDs can be used to indicate response relationships.

The subroutine for FIG. 5 begins at step 505 where the ID for the selected message is retrieved. The subroutine continues to step 510 where the retrieved ID is compared to the IDs of the other current retrieved messages in order to identify related messages. This comparison can identify messages which are responses to the selected message as well as messages to which the selected message responded. Since response messages in the illustrated embodiment include the contents of the messages being responded to, the messages being responded to will be redundant if response messages are pending.

Those skilled in the art will appreciate that messages separated by one or more other response messages (i.e., a chain of response message) can also be identified as being related based on the message IDs. For example, message M5 is in the chain of response messages for message M1, and using the example IDs discussed above, message M5 (with ID 1234-02-01) can be identified as being related to message M1 (with ID 1234) as well as to intermediary message M3 (with ID 1234-02). In this manner, message M1 can be identified as being redundant in light of message M5 even if message M3 is not currently pending. After step 510, the subroutine continues to step 515 to designate as redundant each identified message for which another currently pending message is part of a response message chain of the identified message. After step 515, the subroutine returns at step 595.

FIG. 6 is an exemplary flow diagram of an alternate embodiment of subroutine 420 in which message subjects are used to identify redundant messages. In this embodiment, all of the messages in a message thread have related subjects, and the relationships among subjects indicate which messages are responses to which other messages. For example, related message subjects for the messages shown in FIG. 2B are discussed above with respect to FIG. 3. Those skilled in the art will appreciate that a wide variety of relationships between subjects can be used to indicate response relationships.

The subroutine for FIG. 6 begins at step 605 where the subject for the selected message is retrieved. The subroutine continues to step 610 where the retrieved subject is compared to the subjects of the other current retrieved messages in order to identify related messages. Those skilled in the art will appreciate that messages separated by one or more other response messages can be identified as related based on the message subjects. For example, message M5 with subject "RE: RE: XYZ project-02-01" can be identified as being related to message M1 with subject "XYZ project" as well as to message M3 with subject "RE: XYZ project 02". In this manner, message M1 can be identified as being related to message M5 even if message M3 is not currently pending.

Those skilled in the art will appreciate that in some embodiments, each message will have a unique message subject that allows the relationships for that message to be precisely defined. For example, if messages M2, M3 and M4 all have unique message subjects (e.g., "RE: XYZ project-01," "RE: XYZ project-02" and "RE: XYZ project-03" respectively), then message M5 (e.g., with message subject "RE: RE: XYZ project-02-01") may be identifiable as being related to message M3 rather than M2 or M4. Conversely, if messages M2, M3 and M4 all share the message subject "RE: XYZ project," then a message subject for message M5 such as "RE: RE: XYZ project" would not directly indicate which of the messages M2, M3 or M4 that message M5 had responded to.

In this illustrated embodiment of FIG. 6, response messages have the same message subject as the message to which they are responding, and thus message subjects are not guaranteed to be unique. After step 610, the subroutine continues to step 615 to initially designate the selected message and any other messages with the same message subject as being redundant. This group will include any current retrieved messages in the response chain before or after the selected message (e.g., message M1 to M3 to M5 to M7).

The subroutine then continues to step 620 to remove from the list of messages identified as being redundant the most recently sent message. If the group of messages with the same subject include messages which are responses to other messages in the group, the most recently sent message is likely to have the most inclusive contents. After step 620, the subroutine continues to step 695 and returns. Those skilled in the art will appreciate that subjects alone can be used to identify redundant messages without using message send times (e.g., when each message has a unique message subject), and that message send times can be used in conjunction with other message relation identifiers such as IDs and message contents.

FIG. 7 is an exemplary flow diagram of an alternate embodiment of subroutine 420 in which message contents are used to identify redundant messages. In this embodiment, all of the messages in a message thread have related contents because each response message includes the contents of the message being responded to. Those skilled in the art will appreciate that in other embodiments, none or only some of the contents of the message being responded to may be included in response messages.

The subroutine for FIG. 7 begins at step 705 where the contents for the selected message are retrieved. The subroutine continues to step 710 where the retrieved contents are compared to the contents of the other currently pending messages. This comparison identifies messages whose contents are included in the selected message and messages which include the contents of the selected message. The subroutine then continues to step 715 to designate the identified messages whose contents are included in another identified message as redundant. Those skilled in the art will appreciate that messages separated by one or more other response messages can also be identified as related based on the message contents. For example, message M5 will include the contents of message M1 by including the contents of message M3. In this manner, message M1 can be identified as being redundant in light of message M5 even if message M3 is not currently pending. After step 715, the subroutine returns at step 795.

Figure 8:
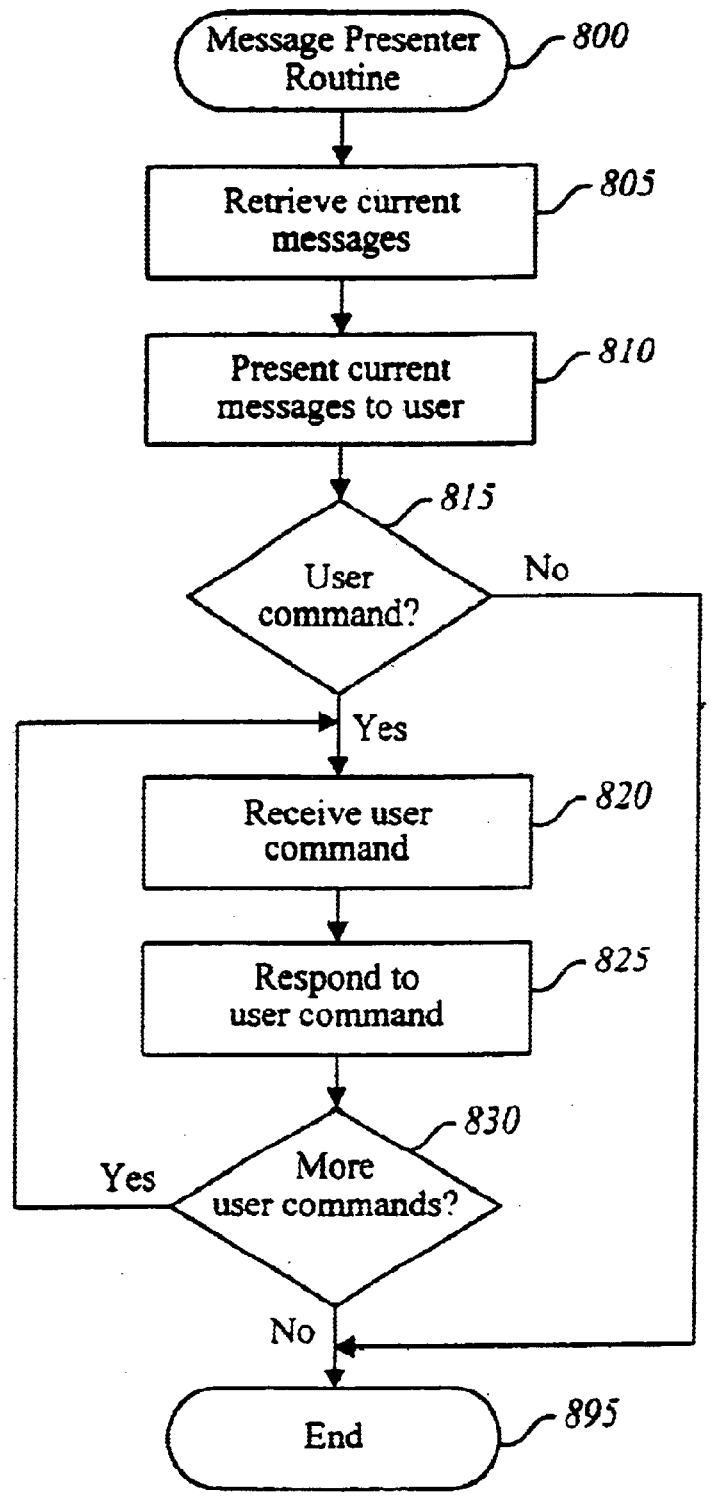
FIG. 8 is an exemplary flow diagram of an embodiment of the Message Presenter routine.

FIG. 8 is an exemplary flow diagram of an embodiment of the Message Presenter 153 routine 800. The Message Presenter routine presents the currently pending message to the user to allow the user to review or respond to the messages. The routine begins at step 805 where the currently pending messages are retrieved. The routine then continues to step 810 where the currently pending messages are presented to the user. In the illustrated embodiment, redundant messages have been eliminated from the group of pending messages by deleting the redundant messages. In other embodiments, however, redundant messages can be identified in other manners such as by having the Message Presenter routine display the redundant messages or indicators for the messages in an altered fashion (e.g., dimmed) or by displaying the redundant messages in a folder other than the default folder. Those skilled in the art will also appreciate that in some embodiments the Message Presenter routine could perform a variety of types of processing on the messages before presenting them, such as managing the messages to determine if any of the messages are redundant in light of other messages.

After step 810, the routine continues to 815 to determine if any user commands have been received. If so, the routine continues to step 820 to receive the user command, and then to step 825 to respond to the user command. The routine then continues to step 830 to determine if there are more user commands. If so, the routine returns to step 820. If it is instead determined in step 830 that there are no more user commands or in step 815 that there were not any user commands, the routine continues to step 895 and ends.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer system for managing electronic messages each having message contents, comprising:
    a message manager that receives an indication of an electronic message sent to the user and that receives an indication of a response electronic message sent by the user responsive to a unique message identifier of the response electronic message being based upon a unique message identifier of the electronic message, the contents of the response electronic message including the contents of the electronic message; and
    a message indicator that, when a copy of the response electronic message is retained for the user, automatically indicates that the electronic message has redundant contents.

2. The computer system of claim 1 wherein the indicating that the electronic message has redundant contents includes deleting the electronic message.

3. The computer system of claim 1 wherein a default visual appearance is used when displaying indicators for electronic messages to the user, and wherein the indicating that the electronic message has redundant contents includes changing the visual appearance of the indicator for the electronic message.

4. The computer system of claim 1 wherein electronic messages received or retained by the user are initially stored in one location, and wherein the indicating that the electronic message has redundant contents includes moving the electronic message to another location.

5. The computer system of claim 1 wherein the message manager further determines that the contents of the response electronic message include the contents of the electronic message by comparing subjects of the electronic message and response electronic message.

6. The computer system of claim 1 wherein the message manager further determines that the contents of the response electronic message include the contents of the electronic message by comparing the contents of the electronic message to the contents of the response electronic message.

7. A computer system for managing electronic messages each having message contents, comprising:
    a message manager that receives an indication of an electronic message sent by a user, and that receives an indication of a response electronic message sent to the user responsive to a unique message identifier of the response electronic message being based upon a unique message identifier of the electronic message, the contents of the response electronic message including the contents of the electronic message; and
    a message indicator that, when a copy of the electronic message is retained for the user, automatically indicates that the electronic message has redundant contents.

8. The computer system of claim 7 wherein the indicating that the electronic message has redundant contents includes deleting the electronic message.

9. The computer system of claim 7 wherein a default visual appearance is used when displaying indicators for electronic messages to the user, and wherein the indicating that the electronic message has redundant contents includes changing the visual appearance of the indicator for the electronic message.

10. The computer system of claim 7 wherein electronic messages received or retained by the user are initially stored in one location, and wherein the indicating that the electronic message has redundant contents includes moving the electronic message to another location.

11. The computer system of claim 7 wherein the message manager further determines that the contents of the response electronic message include the contents of the electronic message by comparing subjects of the electronic message and response electronic message.

12. The computer system of claim 7 wherein the message manager further determines that the contents of the response electronic message include the contents of the electronic message by comparing the contents of the electronic message to the contents of the response electronic message.

13. A computer-readable medium whose contents cause a computer system to manage electronic messages each having message contents by:
    receiving an indication of an electronic message sent to the user;
    receiving an indication of a response electronic message sent by the user, the contents of the response electronic message including the contents of the electronic message when a unique message identifier of the response electronic message is based upon a unique message identifier of the electronic message; and
    when a copy of the response electronic message is retained for the user, automatically indicating that the electronic message has redundant contents.

14. The computer-readable medium of claim 13 wherein the indicating that the electronic message has redundant contents includes deleting the electronic message.

15. The computer-readable medium of claim 13 wherein the contents of the computer-readable medium further cause the computer system to determine that the contents of the response electronic message include the contents of the electronic message by comparing subjects of the electronic message and response electronic message.

16. The computer-readable medium of claim 13 wherein the contents of the computer-readable medium further cause the computer system to determine that the contents of the response electronic message include the contents of the electronic message by comparing the contents of the electronic message to the contents of the response electronic message.

17. A computer-readable medium whose contents cause a computer system to manage electronic messages each having message contents by:
    receiving an indication of an electronic message sent by a user;
    receiving an indication of a response electronic message sent to the user when a unique message identifier of the response electronic message is based upon a unique message identifier of the electronic message, the contents of the response electronic message including the contents of the electronic message; and
    when a copy of the electronic message is retained for the user, automatically indicating that the electronic message has redundant contents.

18. The computer-readable medium of claim 17 wherein the indicating that the electronic message has redundant contents includes deleting the electronic message.

19. The computer-readable medium of claim 17 wherein the contents of the computer-readable medium further cause the computer system to determine that the contents of the response electronic message include the contents of the electronic message by comparing subjects of the electronic message and response electronic message.

20. The computer-readable medium of claim 17 wherein the contents of the computer-readable medium further cause the computer system to determine that the contents of the response electronic message include the contents of the electronic message by comparing the contents of the electronic message to the contents of the response electronic message.

* * * * *